(12) United States Patent
Stegelmann

(10) Patent No.: US 6,438,558 B1
(45) Date of Patent: Aug. 20, 2002

(54) REPLICATING UPDATES IN ORIGINAL TEMPORAL ORDER IN PARALLEL PROCESSING DATABASE SYSTEMS

(75) Inventor: Rolf Günter Erich Stegelmann, Valencia, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/471,736

(22) Filed: Dec. 23, 1999

(51) Int. Cl.[7] .............................................. G06F 17/30
(52) U.S. Cl. ............................ 707/102; 707/4; 707/10; 707/200
(58) Field of Search ............................... 707/102, 1, 4, 707/10, 200

(56) References Cited

U.S. PATENT DOCUMENTS 5,687,363 A * 11/1997 Oulid-Aissa et al. .......... 707/4
5,721,909 A * 2/1998 Oulid-Aissa et al. ......... 707/10
5,764,977 A * 6/1998 Oulid-Aissa et al. ......... 707/10

OTHER PUBLICATIONS

Performance evaluation of functional disk system (FDS–R2)—Kitsuregawa, M. Nakano, M. Takagi, M. Inst. of Ind. Sci., Tokyo Univ., Japan. This paper appears in: Data Engineering, 1991. Proceedings. Seventh International Conference; On page(s): 416–425; Kobe, Japan Apr. 8–12, 1991.*

* cited by examiner

Primary Examiner—Diane D. Mizrahi
(74) Attorney, Agent, or Firm—Gates & Cooper

(57) ABSTRACT

A method, apparatus, and article of manufacture for replicating modifications made to a subject table from a primary system to a subscriber system. A subject table is partitioned across a plurality of processors in both the primary and subscriber systems, wherein each of the processors manages at least one partition of the subject table. Change row messages are generated for each modification made to a subject table, wherein the change row message identifies the processor in the primary system making the modification, and includes a sequence number for the processor in the primary system. The processor in the primary system identified in the change row message is re-mapped to a new processor in the subscriber system and the sequence number for the processor in the primary system identified in the change row message is re-mapped to a new sequence number for the new processor in the subscriber system, so that the modifications are applied in a correct order on the subscriber system.

108 Claims, 5 Drawing Sheets

US 6,438,558 B1

REPLICATING UPDATES IN ORIGINAL TEMPORAL ORDER IN PARALLEL PROCESSING DATABASE SYSTEMS

BACKGROUND OF THE INVENTION

1. Field of the Invention

This invention relates in general to database management systems performed by computers, and in particular, to replicating updates in original temporal order in parallel processing database systems.

2. Description of Related Art

Relational DataBase Management Systems (RDBMS) store data into tables. A table in a relational database is two dimensional, comprising rows and columns. Each column has a name, typically describing the type of data held in that column. As new data is added, more rows are inserted into the table. Structured Query Language (SQL) statements allow users to formulate relational operations on the tables.

In the Teradata® RDBMS sold by NCR Corporation, the assignee of the present invention, tables in the relational database are often partitioned, i.e., the rows for a table are distributed among multiple processors and data storage devices. The partition is usually a horizontal distribution, wherein a table will have all of its rows spread between multiple processors.

However, such partitioning creates problems for replicating the table. For a partitioned table to be replicated, one or a set of those columns in a row must be designated as a unique primary key. The unique primary key definition for a table must be the same on the primary system and all subscriber systems 100 for that table. A primary system generates the SQL statements to update the tables, wherein the updates are then propagated to one or more subscriber systems.

When a transaction on the primary system updates a table that is designated as a replicated table, the changes need to be sent to the subscriber systems. These updates may comprise inserted, changed, and deleted rows. The problem that needs to be solved is that the updates need to be applied on the subscriber systems in the correct sequence.

At first, this might seem like a simple problem, but it can be rather complicated in a parallel processing environment. While there have been various techniques developed for replicating databases, there is a need in the art for improved techniques that replicate databases in a parallel processing environment.

SUMMARY OF THE INVENTION

The present invention discloses a method, apparatus, and article of manufacture for replicating modifications made to a subject table from a primary system to a subscriber system. A subject table is partitioned across a plurality of processors in both the primary and subscriber systems, wherein each of the processors manages at least one partition of the subject table. Change row messages are generated for each modification made to a subject table, wherein the change row message identifies the processor in the primary system making the modification, and includes a sequence number for the processor in the primary system. The processor in the primary system identified in the change row message is re-mapped to a new processor in the subscriber system and the sequence number for the processor in the primary system identified in the change row message is re-mapped to a new sequence number for the new processor in the subscriber system, so that the modifications are applied in a correct order on the subscriber system.

An object of the present invention is to optimize the database access on parallel processing computer systems. Another object of the present invention is to improve the performance of database partitions managed by a parallel processing computer systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention solves the problem of transferring changes made by a transaction from a primary system to one or more subscriber systems in a parallel processing environment in a correct sequence. The purpose of the present invention is to deliver transaction updates (changed rows) to the subscriber systems in the same sequence the changes were applied on the primary system.

The key concept introduced by this invention is a change row re-sequencing method that allows updates to be applied in the correct order on subscriber systems. The key to this method is the re-mapping of a sequence number from the primary system to a new sequence number so the subscriber system can apply the updates in the correct order.

Environment

Figure 1:
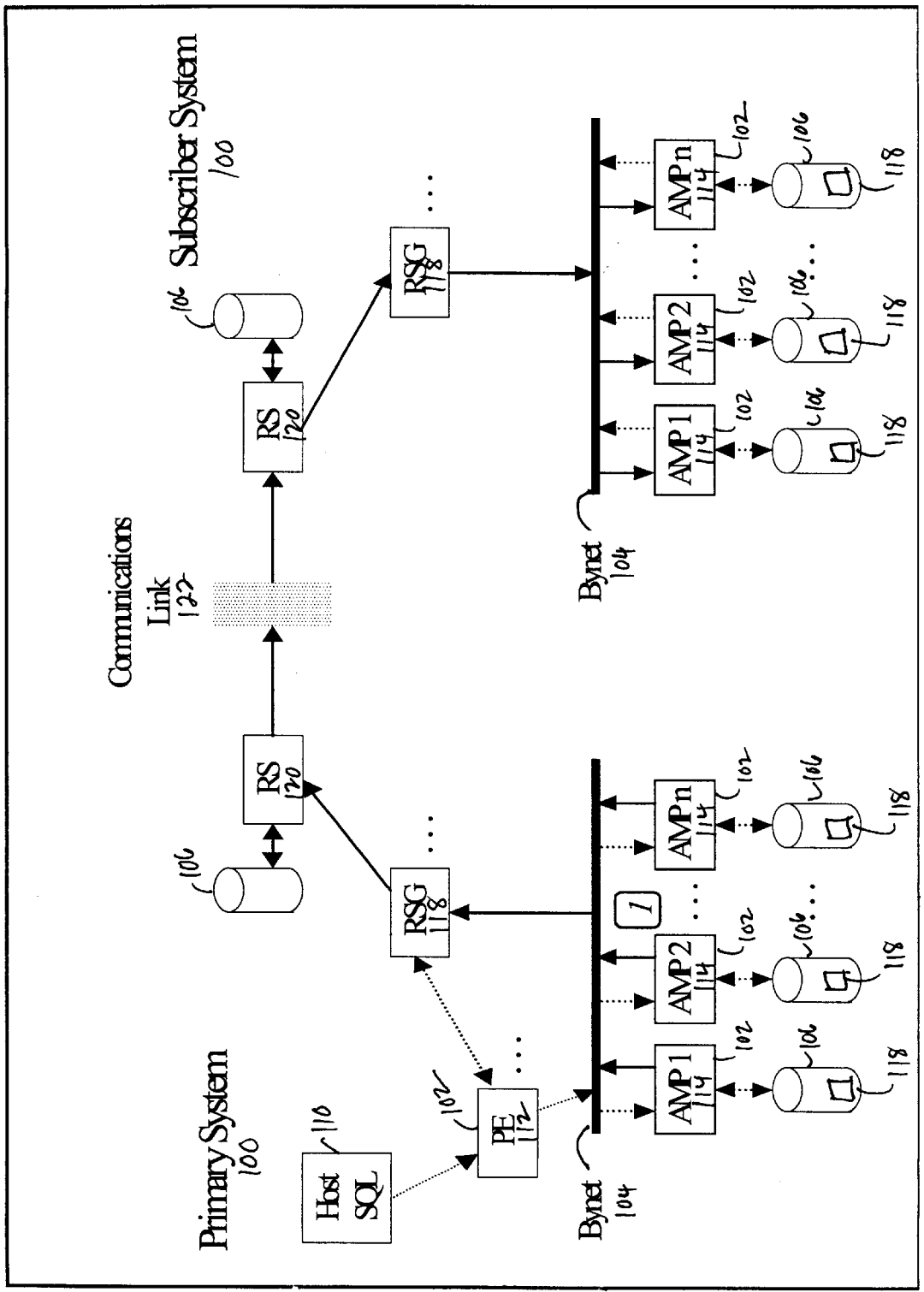
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, primary and subscriber parallel processing database systems 100 each comprise one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the primary system 100 typically use a workstation 110, terminal, computer, or other input device to interact with the primary system 100. This interaction generally comprises queries that conform to the Structured Query Language (SQL) standard, and invoke functions performed by a Relational DataBase Management System (RDBMS) executed by the primary system 100.

In the preferred embodiment of the present invention, the RDBMS comprises the Teradata® product offered by NCR Corporation, and includes one or more Parsing Engines (PEs) 112 and Access Module Processors (AMPs) 114. These components of the RDBMS perform the functions necessary to implement the RDBMS and SQL standards, i.e., definition, compilation, interpretation, optimization, database access control, database retrieval, and database update.

Work is divided among the PUs 102 in the primary system 100 by spreading the storage of a partitioned relational database 116 managed by the RDBMS across multiple AMPs 114 and the DSUs 106 (which are managed by the AMPs 114). Thus, a DSU 106 may store only a subset of rows that comprise a table in the partitioned database 116 and work is managed by the primary system 100 so that the task of operating on each subset of rows is performed by the AMP 114 managing the DSUs 106 that store the subset of rows.

The PEs 112 handle communications, session control, optimization and query plan generation and control. The PEs 112 fully parallelize all functions among the AMPs 114. As a result, the system of FIG. 1 applies a multiple instruction stream, multiple data stream (MIMD) concurrent processing architecture to implement a relational database management system 100.

The primary and subscriber systems 100 communicates with each other by means of a Replication Services Gateway (RSG) 118, Replication Services (RS) 120, and communications link 122. The RSG 118, RS 120, and communications link 122 comprise a path for communicating change row messages from the primary system 100 to the subscriber system 100. These components have the responsibility of forwarding changes for transactions from the primary system 100 to the subscriber systems 100.

Generally, the PEs 112, AMPs 114, RSG 118, and RS 120 are tangibly embodied in and/or accessible from a device, media, carrier, or signal, such as RAM, ROM, one or more of the DSUs 106, and/or a remote system or device communicating with the computer via one or more of the DCUs 108. The PEs 112, AMPs 114, RSG 118, and/or RS 120 each comprise logic and/or data which, when executed, invoked, and/or interpreted, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Operation of the Preferred Embodiment

When a transaction on the primary system 100 updates a table in the database 116 that is designated as a replicated table, the changes need to be sent to the subscriber systems 100. These updates may comprise inserted, changed, and deleted rows. The problem that needs to be solved is that updates must be applied on the subscriber systems 100 in the correct sequence.

This might at first seem like a simple problem, but it is not in a parallel processing environment. Part of the problem that make this difficult is that the message system will not guarantee messages sent from the primary system 100 to the subscriber system 100 will get there in the same order sent. In addition, there is the problem that the source of the change rows for one transaction comes from multiple AMPs 114 in the primary system 100.

The general rules that have to be followed are:

1. All changes applied to a table must be processed in the correct order on the subscriber systems 100.

2. All change rows are applied, and that none are lost in transit.

3. To insure that changes for multiple transactions for the same table are applied in the correct order, i.e., commit sequence order.

In addition, RS 120 must be able to not forward changes for a particular table to a subscriber system 100, if the subscriber system 100 does not have this table defined, even if other subscriber systems 100 do.

According to the method of the preferred embodiment, each transaction that changes a row in a replicated table causes a change row message to be generated. Each change row message contains, besides the changed data, a sequence set. This sequence set comprises the following:

A processor (AMP 114) identifier.

A table identifier.

A sequence number.

The sequence number, or ATTSN (AMP Transaction Table Sequence Number) as it is called, is local to the transaction, is local to the AMP 114 updating the row, and is local to the table being updated by the transaction. It is always created and/or incremented on the AMP 114 that is responsible for the given primary key for the row.

The ATTSN number is incremented each time the transaction updates a row in the table for which a replication change row message is generated. It is possible for one transaction to update the same row more than once. The ATTSN number allows this information to be retained, so that it is possible to apply the changes in the correct order on the subscriber systems 100.

Each change row message in addition to the sequence set defined above contains:

the transaction identifier, the transaction request number, the type of update (insert, update, delete), and the changed data.

The changed row message from each AMP 114 of the primary system 100 is sent to the designated RSG 118, which then forwards the change to the RS 120, which will, in turn, forward the change to one or more subscriber systems 100 via link 122. All changes for one transaction will be applied as a set of changes. If a subsequent transaction changes the same tables as a prior transaction, then those changes also have to be applied on the subscriber system 100, but after, and not before, the first transaction. To insure this sequence, each transaction with its associated changes is assigned a commit sequence number. This number is assigned by the RS 120 at the end of the transaction during a two-phase commit process. This is to insure that the transactions are applied in the correct order. This works because it is impossible for more than one transaction on the primary system 100 to update the same row in the same table at the same time, because the rows being updated are write-locked, thereby allowing only one transaction to update the row at any one time. Such locks are retained until the transaction completes (at commit time.)

All of the change row messages sent to the RS 120 from multiple AMPs 114 for a transaction will not necessarily be received in the correct order. It is up to the RS 120 to forward the change row messages in the order received to the subscriber systems 100.

In the preferred embodiment, the subscriber systems 100 are also parallel processing database systems, although other systems could be used as well. If a subscriber system 100 has a different configuration than the primary system 100 that is sending the changes, such as a different number of AMPs 114, then the changes may have to be distributed to different AMPs 114 via the primary key hash. The problem is that, although the ATTSN numbers assigned to each change row message indicates the order in which they were generated, this does not provide enough information to apply the changes in the correct order at the subscriber system 100. This will become more apparent with an example described in Table 1 below, as well as FIG. 2, which is a dataflow diagram that illustrates the logic and/or data performed by one of the AMPs 114 in the primary system 100 in processing a transaction according to the preferred embodiment of the present invention:

TABLE 1

| Transaction | Processor# | Table | ATTSN# | ChangeType | Hash# |
|---|---|---|---|---|---|
| T1 | 1 | A | 1 | Insert | 1, 0 |
| T1 | 2 | A | 1 | Delete | 2, 1 |
| T1 | 1 | A | 2 | Update | 3, 5 |
| T1 | 1 | A | 3 | Update | 1, 0 |

Figure 2:
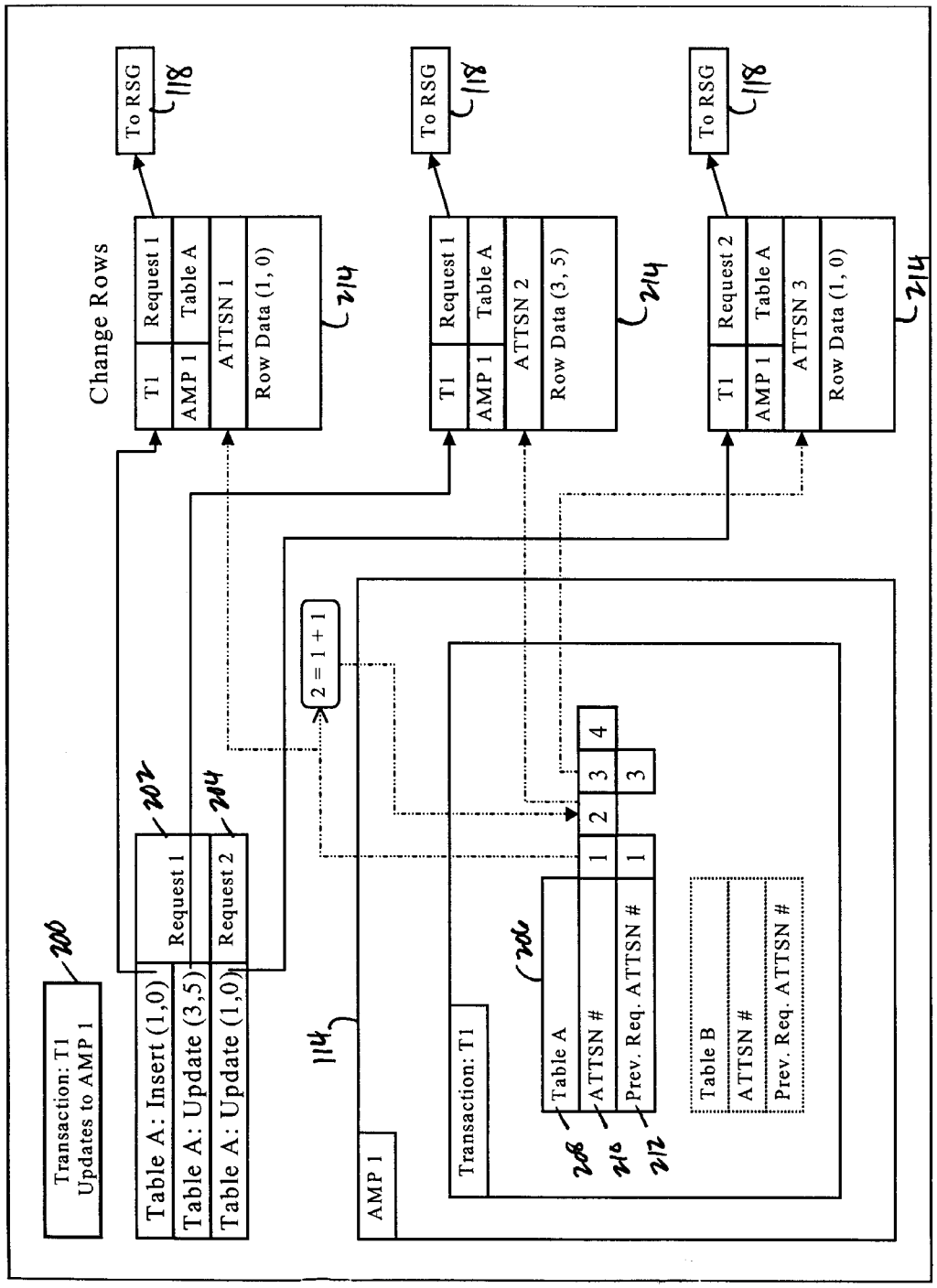
FIG. 2 is a dataflow diagram that illustrates the logic and/or data performed by one of the processing units of a primary system in processing a transaction according to the preferred embodiment of the present invention.

Before discussing Table 1 and FIG. 2 further, the Hash # used in the preferred embodiment is described. In the preferred embodiment, the subject table is partitioned using a hashing algorithm, wherein the hashing algorithm hashes a primary key of the subject table to partition the table. The Hash # comprises a 32 bit number based on the primary key of the subject table, wherein the lower 16 bits of the Hash # comprise a hash bucket and the upper 16 bits comprise the hash position within the hash bucket. Each AMP 114 is assigned a set of hash buckets, and the hash buckets are usually evenly assigned to the AMPs 114. For example, if there are 1000 AMPs 114 in the system 100, then each AMP 114 will be assigned ~65 hash buckets.

The lower 16 bits of the Hash # determine which AMP 114 is assigned a particular row. The entire Hash #, i.e., both upper and lower 16 bits, is used to determine in what position the row belongs in a table. The hash bucket assignments may be different on subscriber systems 100 from the primary system 100. In particular, the systems 100 more than likely will have different number of AMPs 114 and different hash bucket assignments.

In the example of FIG. 2, transaction T1 (200) updates rows of table A stored by AMP 1 on the primary system 100. These updates include two requests, wherein Request 1 (202) includes an Insert for Hash # (1,0) and an Update for Hash # (3,5), and Request 2 (204) includes an Update for Hash # (1,0).

Data structures (206) are used to control the generation of change row messages, wherein there is a different data structure (206) for each table. Each data structure (206) has a table identifier (208), current ATTSN (210), and previous request's ATTSN (212).

Using these data structures (206), the two requests (202, 204) in FIG. 2 result in three change row messages (214) being transmitted from AMP 1 in the primary system 100 to the subscriber system 100 via the RSG 118. The first change row message (214) relates to Request 1, and includes ATTSN 1 and row data (1,0). The second change row message (214) also relates to Request 1, and includes ATISN 2 and row data (3,5). The third change row message (214) relates to Request 2, and includes ATTSN 3 and row data (1,0).

In the example of Table 1, transaction T1 also updates a row of table A stored by AMP 2 on the primary system 100. This update includes one request, which includes a Delete for Hash # (2,1). This request is not shown in FIG. 2.

In the example of Table 1, the Hash # (1,0) and (2, 1) are assigned to different AMPs 114 in the, i.e., AMPs 1 and 2, respectively, on the primary system 100. Also, Hash # (3,5) is also assigned to AMP 1 on the primary system 100. If, on the subscriber system 100, hash bucket 0 and 1 were assigned to the same AMP 114, and hash bucket 0 and 5 were assigned to different AMPs 114, it would be impossible to determine whether any changes were missing and an AMP 114 would not be able to apply the changes on the subscriber system 100.

TABLE 2

| Transaction | Primary AMP | Subscriber AMP | Table | Primary ATTSN | Change Type | Hash# |
|---|---|---|---|---|---|---|
| T1 | 1 | 5 | A | 1 | Insert | 1, 0 |
| T1 | 2 | 5 | A | 1 | Delete | 2, 1 |
| T1 | 1 | 4 | A | 2 | Update | 3, 5 |
| T1 | 1 | 5 | A | 3 | Update | 1, 0 |

Consider the example of Table 2 above, wherein AMP 5 of the subscriber system 100 receives three change row messages. The problem is that AMP 5 receives two rows with an ATTSN of 1 and one row with an ATTSN of 3. Using just the sequence number to determine order of the update is not sufficient. What is worse is that the update with ATTSN of 2 is going to a different AMP 114, i.e., AMP 4. There is no way to determine whether the update for AMP 4 should wait for a change for sequence number 1 to arrive, since changes are supposed to be applied in order. Keep in mind that the message system may not keep the messages in order between the primary and subscriber systems 100, because doing so would require an end-to-end acknowledgement, which is too expensive. Clearly, the sequence numbers are not sufficient to apply the changes in order.

The preferred embodiment uses novel techniques to solve this problem. As the RSG 118 of the subscriber system 110 receives a change row message for a transaction, it examines the:

Processor (AMP 114) identifier,

Table identifier, and

Sequence number (ATTSN).

The RSG 118 at the subscriber system 100 will then track all changes it receives for all change rows by processor (AMP 114) identifier and table identifier. It will expect sequential rows for a processor (AMP 114) and table combination, i.e., it will expect change row message 1 followed by 2, and so on. If, however, it receives change row message 2, for example, and it has not received change row message 1, then it will save change row message 2 in memory. Thereafter, when it receives change row message 1, it can forward the messages to the appropriate AMPs 114 via a sequence number reassignment method explained below. It should be emphasized again that the sequence number is being tracked individually for each sending AMP 114 and table within this AMP 114 for each transaction.

Assume that a change row message is in the correct sequence. Associated with the change row message will be a target AMP 114 this row belongs to or is to be sent to. The target AMP 114 is determined by examining the Hash # of the change row message and looking up the AMP 114 to which the hash bucket is assigned. Associated with this AMP 114 will be the next sequence number to be assigned, called SATSN or Subscriber AMP Transaction Sequence Number. The SATSN is initialized to 1 and incremented by 1 for each change row message targeted to the receiving AMP 114, wherein the change row message is then assigned the new SATSN.

The receiving AMP 114 may receive the messages out of order, but it will always queue a consecutive sequence of changes that it can apply in order for a transaction. To use the same specific example as before, see Table 3 below as well as FIG. 3, which is a dataflow diagram that illustrates the logic and/or data performed by one of the AMPs 114 in the subscriber system 100 in processing a transaction according to the preferred embodiment of the present invention:

TABLE 3

| Trans-action | Primary AMP | Subscriber AMP | Table | Primary ATTSN | Change Type | Hash # | Subscriber SATSN |
|---|---|---|---|---|---|---|---|
| T1 | 1 | 5 | A | 1 | Insert | 1.0 | 1 |
| T1 | 2 | 5 | A | 1 | Delete | 2.1 | 2 |
| T1 | 1 | 4 | A | 2 | Update | 3.5 | 1 |
| T1 | 1 | 5 | A | 3 | Update | 1.0 | 3 |

In this example, transaction T1 updates rows of table A stored by AMPs 1 and 2 on the subscriber system 100. These updates include two requests, wherein Request 1 includes an Insert for Hash # (1,0), an Update for Hash # (2,1), and an Update for Hash # (3,5), and Request 2 includes a Delete for Hash # (1,0).

These two requests result in four change row messages (300) being transmitted by the primary system 100 to the subscriber system 100 via the RSG 118. The first change row message (300) relates to Request 1 and AMP 1, and includes ATTSN 1 and row data (1,0). The second change row message (300) relates to Request 2 and AMP 1, and includes ATTSN 3 and row data (1,0). The third change row message (300) relates to Request 1 and AMP 2, and includes ATTSN 1 and row data (2,1). The fourth change row message (300) relates to Request 1 and AMP 1, and includes ATTSN 2 and row data (3,5).

Figure 3:
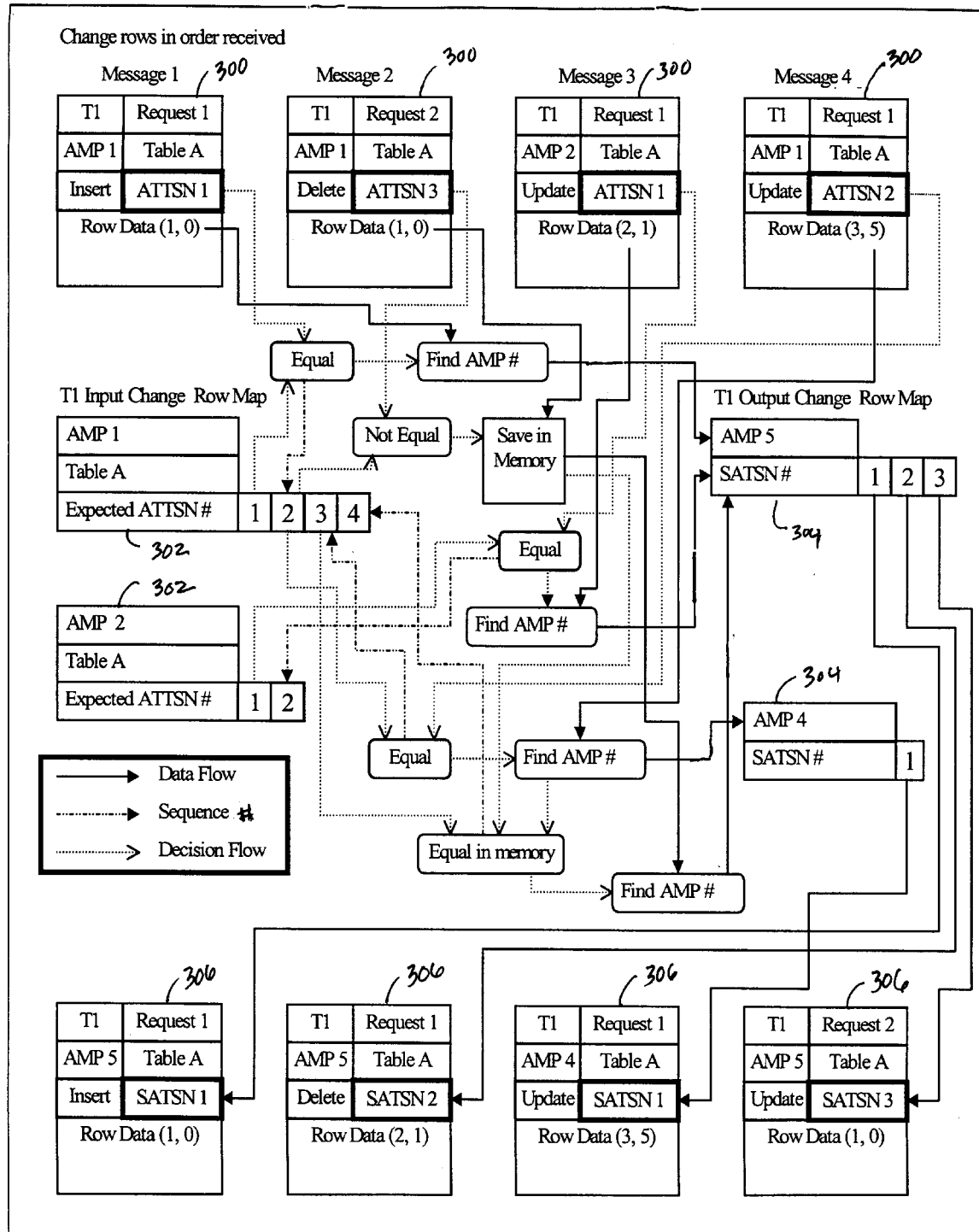
FIG. 3 is a dataflow diagram that illustrates the logic and/or data performed by one of the processing units of a subscriber system in processing a transaction according to the preferred embodiment of the present invention.

The subscriber system 100 uses a transaction context to control the handling of these change row messages (300). In FIG. 3, the transaction context is maintained by input change row maps (302) and output change row maps (304). The input change row maps (302) and output change row maps (304) include separate entries for each processor (AMP 114) identifier and table identifier. For the input change row maps (302), these entries store an Expected ATTSN value; for the output change row maps (304), these entries store an SATSN.

When the first change row message (300) is received from AMP 1 on the primary system 100, the expected ATTSN from transaction T1 matches (i.e., ATTSN 1), and a function to identify a corresponding AMP 114 on the subscriber system 100 is performed, which results in an output change row message (306) identifying AMP 5 on the subscriber system 100 and the assignment of SATSN 1.

When the change second change row message (300) is received from AMP 1 on the primary system 100, the expected ATTSN from transaction T1 does not match, i.e., ATTSN 3 in the second row message (300) as compared to ATTSN 2 of the input change row map 302, so the message (300) is saved in memory.

When the third change row message (300) is received from AMP 2 on the primary system 100, the expected ATTSN from transaction T1 matches (i.e., ATTSN 1), and a function to identify a corresponding AMP 114 on the subscriber system 100 is performed, which results in an output change row message (306) identifying AMP 5 on the subscriber system 100 and the assignment of SATSN 2.

When the fourth change row message (300) is received from AMP 1 on the primary system 100, the expected ATTSN from transaction T1 matches (i.e., ATTSN 2), and a function to identify a corresponding AMP 114 on the subscriber system 100 is performed, which results in an output change row message (306) identifying AMP 4 on the subscriber system 100 and the assignment of SATSN 1.

At this time, the second change row message (300) can now be processed in its correct order, so it is read out of the memory, the expected ATTSN from transaction T1 matches (i.e., ATTSN 3), and a function to identify a corresponding AMP 114 on the subscriber system 100 is performed, which results in an output change row message (306) identifying AMP 5 on the subscriber system 100 and the assignment of SATSN 3.

Notice that it is possible to receive the first two change row messages (300) in a different order, wherein the messages (300) would be forwarded to the AMP 114 in a different order. This does not comprise an error, because the rows do not relate to each other, in fact, the change row messages (300) were generated by different AMPs 114 on the primary system 100. As shown in Table 4, such messages (300) can be applied in a different order:

TABLE 4

| Trans-action | Primary AMP | Subscriber AMP | Table | Primary ATTSN | Change Type | Hash # | Subscriber SATSN |
|---|---|---|---|---|---|---|---|
| T1 | 2 | 5 | A | 1 | Delete | 2.1 | 1 |
| T1 | 1 | 5 | A | 1 | Insert | 1.0 | 2 |
| T1 | 1 | 4 | A | 2 | Update | 3.5 | 1 |
| T1 | 1 | 5 | A | 3 | Update | 1.0 | 3 |

The astute observer might wonder why the primary sequence is broken down by processor (AMP 114) identifier and table identifier within a transaction. Is it not sufficient to base it on processor (AMP 114) identifier only? Yes, it could be, but by breaking down the sequence by table identifier as well makes it easy for the RS 120 to drop all changes for a particular table and not destroy the consecutive sequence numbers, which is what would happen if it were based on processor (AMP 114) identifier only. The RS 120 is allowed to define what set of changes are propagated to each subscriber system 100. It is possible for one transaction to update several tables, some of which may be transferred to some subscriber systems 100, but not to others.

Figure 4A:
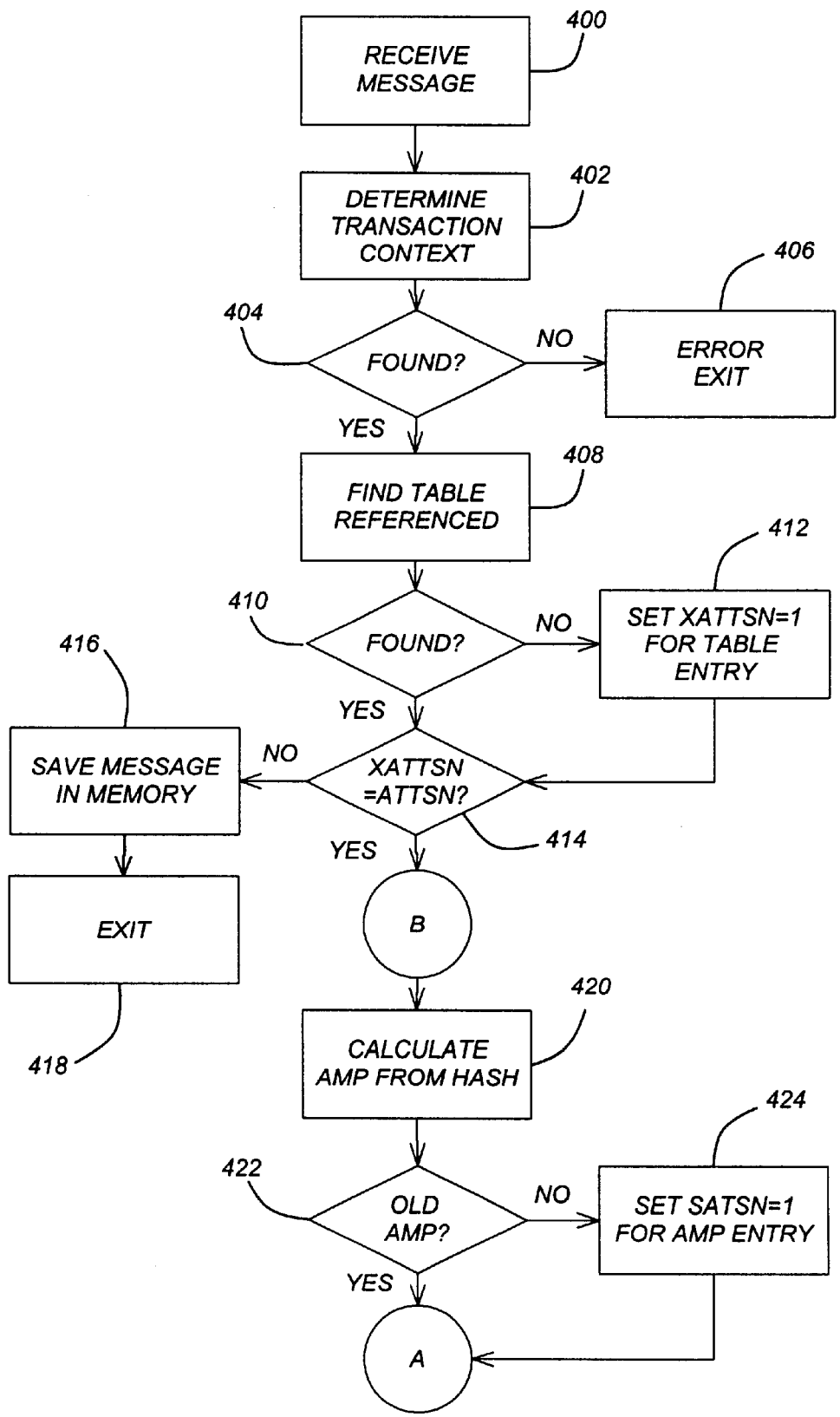
FIGS. 4A and 4B together are a flow chart illustrating the steps necessary for the interpretation and execution of logic according to the preferred embodiment of the present invention.
Figure 4B:
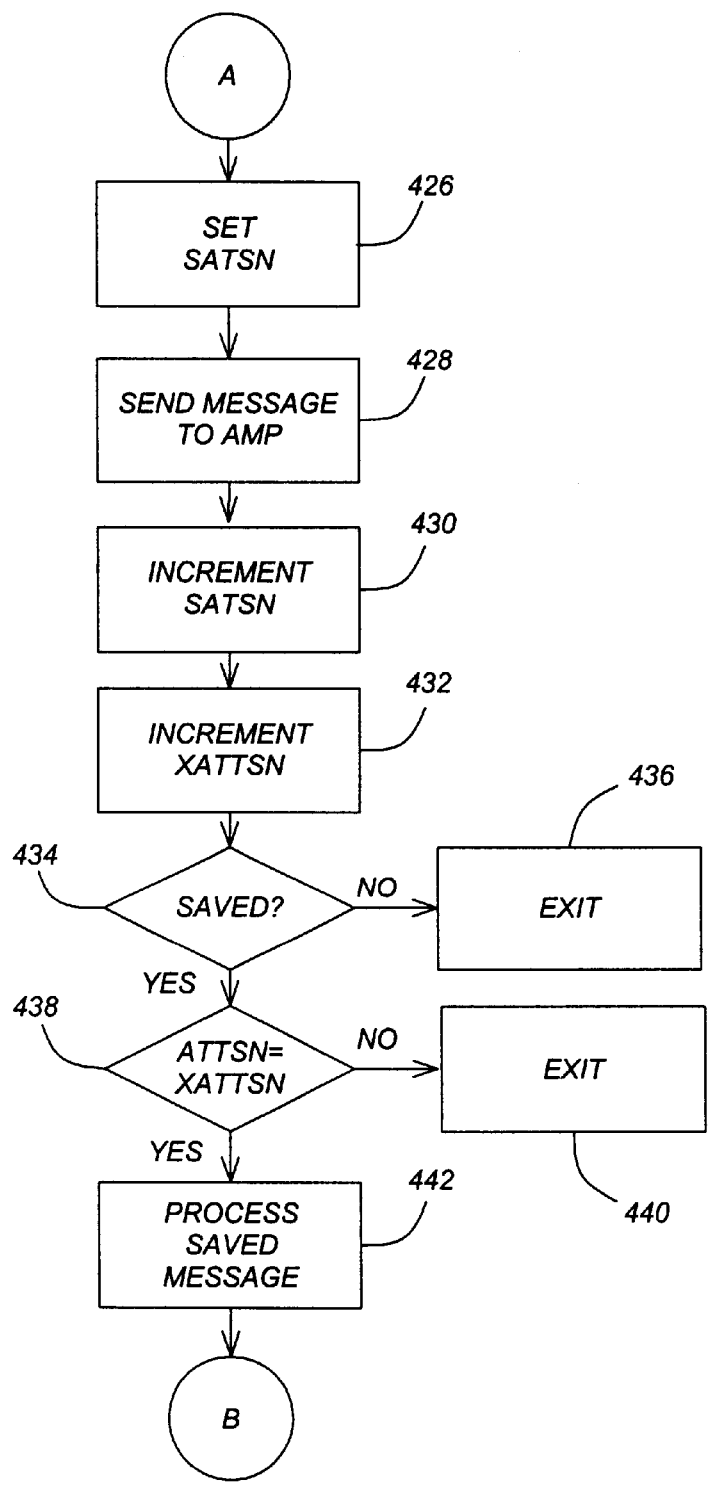

The method of reassigning the sequence number on the subscriber system 100, ATTSN to SATSN, is shown in FIGS. 4A and 4B, which are described in more detail below. This method, or one like it, is used to apply all change row messages to subscriber systems 100.

There are two modes that can be used to apply the changes to a subscriber system 100. One is synchronous and the other is asynchronous.

Synchronous replication implies that changes are applied "live". That is, changes are sent over to the subscriber systems 100 as soon as the originating primary transaction makes the change. The subscriber systems 100 apply them as the transaction progresses. At the end of the transaction, a two-phase commit process is entered into, to insure that all subscriber systems 100 can commit, or if one on them cannot commit, then it will insure that the transaction can be aborted.

Under ANSI transaction semantics, it is also possible for a transaction to abort a request without aborting the whole transaction. It has not been mentioned yet, but each change row message also has associated with it the request number. If a request is aborted, then the changes for that request have to be backed out, without backing out all changes for the transaction. The difficulty here is not the backing out of the changed rows, but in insuring that gaps do not occur in the sequence numbers.

The problem is solved in the following manner. If a request abort happens, those changes applied on the subscriber system 100 will be backed out. Those changes in progress will be thrown away by the RS 120. After this has been accomplished, the sequence number kept on the primary system 100 for each AMP 114 for each table, touched by the request, for the transaction, will be restored to the value prior to when the request started. This avoids having any gaps in the sequence numbers. This also means that, whenever a transaction starts a new update request, the first sequence number for the current request will be saved.

FIG. 2 is an example with a request number change. If request 2 were aborted, then the sequence number (ATTSN) will be restored to 3.

Asynchronous replication implies that changes are applied later after the transaction completes. There are two types of asynchronous replication, immediate and deferred. In immediate asynchronous replication, the changes are applied almost as soon as the primary transaction completes. The changes are all propagated by the RS 120 to all subscriber systems 100 before the transaction is allowed to complete. The changes are saved by the RS 120 on a DSU 106 independent of the DSU 106 storing the database 118. In deferred asynchronous replication, the changes may be applied hours or even days later, at the end-users' choosing.

When the changes are applied on the subscriber system 100 later, the exact same process is used to reassign the sequence numbers, as explained before in FIG. 4. But, as the changes are sent to the AMPs 114, instead of being applied, they are all written to a spool file on the DSU 106 (used for temporary storage) with the new sequence number. A whole batch of transactions may be written to the spool file.

As stated earlier, each transaction also has a commit sequence number associated with it, besides the actual change row sequence number, SATSN. The loading process can be performed by several RSGs 118 at the same time. Each RSG 118 can send its own set of transactions. They will all go into the same spool file. After all changes for all transactions in this "batch" are loaded, the spool file is sorted on transaction commit sequence number (major key and change row sequence number, SATSN (minor key). After that is done, the changes are applied in transaction commit sequence order.

All AMPs 114 work on one transaction at a time. Each AMP 114 does not start the next transaction until the previous transaction has been committed on all AMPs 114 that have changes for the transactions. The commit process is coordinated by the PE 112 for each "batch" and insures that commits are done in order.

While the tables are being updated, it is possible for there to be interference with other transactions submitted by local users of the subscriber system 100. In some cases, it is possible for this interference to cause a deadlock This happens when "batch" transaction T1, for example, holds a write lock on row A on AMP P1 and user transaction UT1 is waiting for a read lock on that same row A on AMP P1. If user transactions UT1 is also holding a read lock on row B on AMP P2 and "batch" transaction T1 is waiting for a write lock on row B on this same AMP P2, then this is a classic deadlock situation. The global deadlock detection logic of the RDBMS will find this deadlock. If it decides to pick the "batch" transaction T1 to abort, then the PE 112 will restart this transaction. It will be rolled back and restarted. If this is not done, then it would be impossible to commit subsequent transactions in the batch.

For asynchronous mode, request aborts are handled by the RS 120 throwing away the change rows. Therefore, the "batch" process will never see them. There will never be a gap in the sequence numbers.

Logic of the Preferred Embodiment

FIGS. 4A and 4B together are a flow chart illustrating the steps necessary for the interpretation and execution of logic according to the preferred embodiment of the present invention. Although the preferred embodiment uses a specific sequence of steps, those skilled in the art will recognize that the invention disclosed herein may use different steps, so long as similar functions are provided thereby.

Block 400 represents the subscriber system 100 receiving a change row message from the primary system 100.

Block 402 represents the subscriber system 100 determining the transaction context for the received change row message.

Block 404 is a decision block that represents the subscriber system 100 determining whether the transaction context for the received change row message was found. If not, then an error exit is performed at Block 406; otherwise, control transfers to Block 408.

Block 408 represents the subscriber system 100 finding the table referenced by the received change row message.

Block 410 is a decision block that represents the subscriber system 100 determining whether the table referenced by the received change row message was found. If not, then control transfers to Block 412; otherwise, control transfers to Block 414.

Block 412 represents the subscriber system 100 creating a new input and output change row map (i.e., this is a first change row for this table) and an associated xATTSN (Expected ATTSN) is initialized to 1.

Block 414 is a decision block that represents the subscriber system 100 determining whether the ATTSN of the received change row message matches the xATTSN. If not, then control transfers to Block 416; otherwise, control transfers to Block 418.

Block 416 represents the subscriber system 100 saving the change row message in memory ordered according to xATTSN. This Block indicates that the message was received out of order. Thereafter, control transfers to Block 418, which exits.

Block 420 represents the subscriber system 100 calculating the AMP number from the Hash # associated with the change row message.

Block 422 is a decision block that represents the subscriber system 100 determining whether the calculated AMP of the received change row message is an AMP that already exists in the output change row map. If not, then control transfers to Block 424; otherwise, control transfers to Block 426 in FIG. 4B via "A".

Block 424 represents the subscriber system 100 creating an AMP entry in the output change row map and initializing the SATSN for the created AMP entry to 1. Thereafter, control transfers to Block 426 in FIG. 4B via "A".

Block 426 represents the subscriber system 100 setting the SATSN in the output change row message.

Block 428 represents the subscriber system 100 sending the output change row message to the specified AMP 114 in the subscriber system 100.

Block 430 represents the subscriber system 100 incrementing the SATSN for the AMP entry in the output change row map.

Block 432 represents the subscriber system 100 incrementing the xATTSN for the AMP entry in the input change row map.

Block 434 is a decision block that represents the subscriber system 100 determining whether there are any saved messages in memory. If not, then control transfers to Block 436, which exits; otherwise, control transfers to Block 438.

Block 438 is a decision block that represents the subscriber system 100 determining whether the ATTSN of the saved message matches the xATTSN. If not, then control transfers to Block 440, which exits; otherwise, control transfers to Block 442.

Block 442 represents the subscriber system 100 processing the saved change row message, in effect by making it the current change row message and then returning control to Block 420 in FIG. 4A via "B".

Conclusion

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any DBMS or other program that performs similar functions could be used to implement the present invention.

In another alternative embodiment, the partitions of the table need not be spread across separate data storage devices. Instead, the partitions could be stored on one or a few data storage devices simply to minimize the amount of temporary data storage required at each of the steps of the method.

In yet another alternative embodiment, the steps or logic could be performed by more or fewer processors, rather than the designated and other processors as described above. For example, the steps could be performed simultaneously on a single processor using a multitasking operating environment.

In summary, the present invention discloses a method, apparatus, and article of manufacture for replicating modifications made to a subject table from a primary system to a subscriber system. A subject table is partitioned across a plurality of processors in both the primary and subscriber systems, wherein each of the processors manages at least one partition of the subject table. Change row messages are generated for each modification made to a subject table, wherein the change row message identifies the processor in the primary system making the modification, and includes a sequence number for the processor in the primary system. The processor in the primary system identified in the change row message is re-mapped to a new processor in the subscriber system and the sequence number for the processor in the primary system identified in the change row message is re-mapped to a new sequence number for the new processor in the subscriber system, so that the modifications are applied in a correct order on the subscriber system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for replicating modifications made to a subject table from a primary system to a subscriber system, comprising:

(a) receiving one or more change row messages generated for each modification made to a subject table partitioned across a plurality of processors in a primary system, wherein each of the processors manages at least one partition of the subject table, the change row message identifies the processor in the primary system making the modification, and the change row message includes a sequence number for the processor in the primary system; and (b) mapping the processor in the primary system identified in the change row message to a new processor in the subscriber system and mapping the sequence number for the processor in the primary system identified in the change row message to a new sequence number for the new processor in the subscriber system, so that the modifications are applied in a correct order on the subscriber system.

2. The method of claim 1, wherein the change row messages are generated in the primary system for each modification made to the subject table.

3. The method of claim 1, wherein the change row message identifies the subject table.

4. The method of claim 1, wherein the sequence number is local to a transaction.

5. The method of claim 4, wherein the sequence number is incremented for each modification made to the subject table for the transaction for which a change row message is generated.

6. The method of claim 4, wherein the change row message includes a transaction identifier.

7. The method of claim 4, wherein the change row message includes a transaction request number.

8. The method of claim 4, further comprising creating input and output change row maps for the transaction.

9. The method of claim 8, further comprising creating an expected sequence number in the input change row map for the processor in the primary system and initializing the expected sequence number to 1.

10. The method of claim 9, further comprising:

determining whether the change row message is received out of order when the sequence number of the change row message does not match the expected sequence number; and saving the change row message in memory ordered according to the expected sequence number when the change row message is received out of order.

11. The method of claim 8, further comprising creating an entry in the output change row map for the new processor and initializing the new sequence number to 1.

12. The method of claim 1, wherein the change row message includes a type of modification.

13. The method of claim 1, wherein the change row message includes changed data for the modification.

14. The method of claim 1, wherein the mapping step further comprises identifying the new processor on the subscriber system using a hash number in the change row message.

15. The method of claim 1, further comprising initializing the new sequence number to 1 for a first change row message and incrementing the new sequence number by 1 for each change row message sent to the new processor.

16. The method of claim 1, further comprising queuing out-of-order change row messages until they can be applied in order.

17. The method of claim 1, further comprising identifying the new processor for the change row message using a hash number associated with the change row message.

18. The method of claim 1, further comprising not forwarding change row messages to the subscriber system, if the subscriber system does not have the subject table defined.

19. An apparatus for replicating modifications made to a subject table from a primary system to a subscriber system, comprising:
   (a) a subscriber system having a plurality of processing units, each with zero or more data storage devices coupled thereto, wherein the data storage devices store at least one subject table;
   (b) logic, performed by the subscriber system, for:
      (1) receiving one or more change row messages generated for each modification made to a subject table partitioned across a plurality of processors in a primary system, wherein each of the processors in the primary system manages at least one partition of the subject table, the change row message identifies the processor in the primary system making the modification, and the change row message includes a sequence number for the processor in the primary system; and
      (2) mapping the processor in the primary system identified in the change row message to a new processor in the subscriber system and mapping the sequence number for the processor in the primary system identified in the change row message to a new sequence number for the new processor in the subscriber system, so that the modifications are applied in a correct order on the subscriber system.

20. The apparatus of claim 19, wherein the change row messages are generated in the primary system for each modification made to the subject table.

21. The apparatus of claim 19, wherein the change row message identifies the subject table.

22. The apparatus of claim 19, wherein the sequence number is local to a transaction.

23. The apparatus of claim 22, wherein the sequence number is incremented for each modification made to the subject table for the transaction for which a change row message is generated.

24. The apparatus of claim 22, wherein the change row message includes a transaction identifier.

25. The apparatus of claim 22, wherein the change row message includes a transaction request number.

26. The apparatus of claim 22, further comprising logic for creating input and output change row maps for the transaction.

27. The apparatus of claim 26, further comprising logic for creating an expected sequence number in the input change row map for the processor in the primary system and for initializing the expected sequence number to 1.

28. The apparatus of claim 27, further comprising logic for:
   determining whether the change row message is received out of order when the sequence number of the change row message does not match the expected sequence number; and
   saving the change row message in memory ordered according to the expected sequence number when the change row message is received out of order.

29. The apparatus of claim 26, further comprising logic for creating an entry in the output change row map for the new processor and initializing the new sequence number to 1.

30. The apparatus of claim 19, wherein the change row message includes a type of modification.

31. The apparatus of claim 19, wherein the change row message includes changed data for the modification.

32. The apparatus of claim 19, wherein the logic for mapping further comprises logic for identifying the new processor on the subscriber system using a hash number in the change row message.

33. The apparatus of claim 19, further comprising logic for initializing the new sequence number to 1 for a first change row message and incrementing the new sequence number by 1 for each change row message sent to the new processor.

34. The apparatus of claim 19, further comprising logic for queuing out-of-order change row messages until they can be applied in order.

35. The apparatus of claim 19, further comprising logic for identifying the new processor for the change row message using a hash number associated with the change row message.

36. The apparatus of claim 19, further comprising logic for not forwarding change row messages to the subscriber system, if the subscriber system does not have the subject table defined.

37. An article of manufacture embodying logic for a method for replicating modifications made to a subject table from a primary system to a subscriber system, the method comprising:
   (a) generating one or more change row messages for each modification made to a subject table partitioned across a plurality of processors in a primary system, wherein each of the processors manages at least one partition of the subject table, the change row message identifies the processor in the primary system making the modification, and the change row message includes a sequence number for the processor in the primary system; and
   (b) mapping the processor in the primary system identified in the change row message to a new processor in the subscriber system and mapping the sequence number for the processor in the primary system identified in the change row message to a new sequence number for the new processor in the subscriber system, so that the modifications are applied in a correct order on the subscriber system.

38. The method of claim 37, wherein the change row messages are generated in the primary system for each modification made to the subject table.

39. The method of claim 37, wherein the change row message identifies the subject table.

40. The method of claim 37, wherein the sequence number is local to a transaction.

41. The method of claim 40, wherein the sequence number is incremented for each modification made to the subject table for the transaction for which a change row message is generated.

42. The method of claim 40, wherein the change row message includes a transaction identifier.

43. The method of claim 40, wherein the change row message includes a transaction request number.

44. The method of claim 40, further comprising creating input and output change row maps for the transaction.

45. The method of claim 44, further comprising creating an expected sequence number in the input change row map for the processor in the primary system and initializing the expected sequence number to 1.

46. The method of claim 45, further comprising:
  determining whether the change row message is received out of order when the sequence number of the change row message does not match the expected sequence number; and
  saving the change row message in memory ordered according to the expected sequence number when the change row message is received out of order.

47. The method of claim 44, further comprising creating an entry in the output change row map for the new processor and initializing the new sequence number to 1.

48. The method of claim 37, wherein the change row message includes a type of modification.

49. The method of claim 37, wherein the change row message includes changed data for the modification.

50. The method of claim 37, wherein the mapping step further comprises identifying the new processor on the subscriber system using a hash number in the change row message.

51. The method of claim 37, further comprising initializing the new sequence number to 1 for a first change row message and incrementing the new sequence number by 1 for each change row message sent to the new processor.

52. The method of claim 37, further comprising queuing out-of-order change row messages until they can be applied in order.

53. The method of claim 37, further comprising identifying the new processor for the change row message using a hash number associated with the change row message.

54. The method of claim 37, further comprising not forwarding change row messages to the subscriber system, if the subscriber system does not have the subject table defined.

55. A method for replicating modifications made to a subject table from a primary system to a subscriber system, comprising:
  (a) generating one or more change row messages for at least one modification made to a subject table partitioned across a plurality of processors in a primary system, wherein each of the processors manages at least one partition of the subject table, the change row message identifies the processor in the primary system making the modification, and the change row message includes a sequence number for the processor in the primary system; and
  (b) transmitting the change row messages to a subscriber system, wherein the processor in the primary system identified in the change row message is mapped to a new processor in the subscriber system and the sequence number for the processor in the primary system identified in the change row message is mapped to a new sequence number for the new processor in the subscriber system, so that the modifications are applied in a correct order on the subscriber system.

56. The method of claim 55, wherein the change row messages are generated in the primary system for each modification made to the subject table.

57. The method of claim 55, wherein the change row message identifies the subject table.

58. The method of claim 55, wherein the sequence number is local to a transaction.

59. The method of claim 58, wherein the sequence number is incremented for each modification made to the subject table for the transaction for which a change row message is generated.

60. The method of claim 58, wherein the change row message includes a transaction identifier.

61. The method of claim 58, wherein the change row message includes a transaction request number.

62. The method of claim 58, further comprising creating input and output change row maps for the transaction.

63. The method of claim 62, further comprising creating an expected sequence number in the input change row map for the processor in the primary system and initializing the expected sequence number to 1.

64. The method of claim 63, further comprising:
  determining whether the change row message is received out of order when the sequence number of the change row message does not match the expected sequence number; and
  saving the change row message in memory ordered according to the expected sequence number when the change row message is received out of order.

65. The method of claim 62, further comprising creating an entry in the output change row map for the new processor and initializing the new sequence number to 1.

66. The method of claim 55, wherein the change row message includes a type of modification.

67. The method of claim 55, wherein the change row message includes changed data for the modification.

68. The method of claim 55, further comprising identifying the new processor on the subscriber system using a hash number in the change row message.

69. The method of claim 55, further comprising initializing the new sequence number to 1 for a first change row message and incrementing the new sequence number by 1 for each change row message sent to the new processor.

70. The method of claim 55, further comprising queuing out-of-order change row messages until they can be applied in order.

71. The method of claim 55, further comprising identifying the new processor for the change row message using a hash number associated with the change row message.

72. The method of claim 55, further comprising not forwarding change row messages to the subscriber system, if the subscriber system does not have the subject table defined.

73. An apparatus for replicating modifications made to a subject table from a primary system to a subscriber system, comprising:
  (a) a primary system having a plurality of processing units, each with zero or more data storage devices coupled thereto, wherein the data storage devices store at least one subject table;
  (b) logic, performed by the primary system, for:
    (1) generating one or more change row messages for at least one modification made to a subject table partitioned across a plurality of processors in a primary system, wherein each of the processors manages at least one partition of the subject table, the change row message identifies the processor in the primary system making the modification, and the change row message includes a sequence number for the processor in the primary system; and (2) transmitting the change row messages to a subscriber system, wherein the processor in the primary system identified in the change row message is mapped to a new processor in the subscriber system and the sequence number for the processor in the primary system identified in the change row message is mapped to a new sequence number for the new processor in the subscriber system, so that the modifications are applied in a correct order on the subscriber system.

74. The apparatus of claim 73, wherein the change row messages are generated in the primary system for each modification made to the subject table.

75. The apparatus of claim 73, wherein the change row message identifies the subject table.

76. The apparatus of claim 73, wherein the sequence number is local to a transaction.

77. The apparatus of claim 76, wherein the sequence number is incremented for each modification made to the subject table for the transaction for which a change row message is generated.

78. The apparatus of claim 76, wherein the change row message includes a transaction identifier.

79. The apparatus of claim 76, wherein the change row message includes a transaction request number.

80. The apparatus of claim 76, further comprising logic for creating input and output change row maps for the transaction.

81. The apparatus of claim 80, further comprising logic for creating an expected sequence number in the input change row map for the processor in the primary system and for initializing the expected sequence number to 1.

82. The apparatus of claim 81, further comprising logic for:
determining whether the change row message is received out of order when the sequence number of the change row message does not match the expected sequence number; and
saving the change row message in memory ordered according to the expected sequence number when the change row message is received out of order.

83. The apparatus of claim 80, further comprising logic for creating an entry in the output change row map for the new processor and initializing the new sequence number to 1.

84. The apparatus of claim 73, wherein the change row message includes a type of modification.

85. The apparatus of claim 73, wherein the change row message includes changed data for the modification.

86. The apparatus of claim 73, further comprising logic for identifying the new processor on the subscriber system using a hash number in the change row message.

87. The apparatus of claim 73, further comprising logic for initializing the new sequence number to 1 for a first change row message and incrementing the new sequence number by 1 for each change row message sent to the new processor.

88. The apparatus of claim 73, further comprising logic for queuing out-of-order change row messages until they can be applied in order.

89. The apparatus of claim 73, further comprising logic for identifying the new processor for the change row message using a hash number associated with the change row message.

90. The apparatus of claim 73, further comprising logic for not forwarding change row messages to the subscriber system, if the subscriber system does not have the subject table defined.

91. An article of manufacture embodying logic for a method for replicating modifications made to a subject table from a primary system to a subscriber system, the method comprising:

(a) generating one or more change row messages for at least one modification made to a subject table partitioned across a plurality of processors in a primary system, wherein each of the processors manages at least one partition of the subject table, the change row message identifies the processor in the primary system making the modification, and the change row message includes a sequence number for the processor in the primary system; and (b) transmitting the change row messages to a subscriber system, wherein the processor in the primary system identified in the change row message is mapped to a new processor in the subscriber system and the sequence number for the processor in the primary system identified in the change row message is mapped to a new sequence number for the new processor in the subscriber system, so that the modifications are applied in a correct order on the subscriber system.

92. The method of claim 91, wherein the change row messages are generated in the primary system for each modification made to the subject table.

93. The method of claim 91, wherein the change row message identifies the subject table.

94. The method of claim 91, wherein the sequence number is local to a transaction.

95. The method of claim 94, wherein the sequence number is incremented for each modification made to the subject table for the transaction for which a change row message is generated.

96. The method of claim 94, wherein the change row message includes a transaction identifier.

97. The method of claim 94, wherein the change row message includes a transaction request number.

98. The method of claim 94, further comprising creating input and output change row maps for the transaction.

99. The method of claim 98, further comprising creating an expected sequence number in the input change row map for the processor in the primary system and initializing the expected sequence number to 1.

100. The method of claim 99, further comprising:
determining whether the change row message is received out of order when the sequence number of the change row message does not match the expected sequence number; and
saving the change row message in memory ordered according to the expected sequence number when the change row message is received out of order.

101. The method of claim 98, further comprising creating an entry in the output change row map for the new processor and initializing the new sequence number to 1.

102. The method of claim 91, wherein the change row message includes a type of modification.

103. The method of claim 91, wherein the change row message includes changed data for the modification.

104. The method of claim 91, further comprising identifying the new processor on the subscriber system using a hash number in the change row message.

105. The method of claim 91, further comprising initializing the new sequence number to 1 for a first change row message and incrementing the new sequence number by 1 for each change row message sent to the new processor.

106. The method of claim 91, further comprising queuing out-of-order change row messages until they can be applied in order.

107. The method of claim 91, further comprising identifying the new processor for the change row message using a hash number associated with the change row message.

108. The method of claim 91, further comprising not forwarding change row messages to the subscriber system, if the subscriber system does not have the subject table defined.

* * * * *